United States Patent [19]

Mayn

[11] Patent Number: 5,201,538
[45] Date of Patent: Apr. 13, 1993

[54] ERGONOMIC CYCLES

[76] Inventor: Charles R. Mayn, 2701 N. Ocean, #307, Boca Raton, Fla. 33431

[21] Appl. No.: 707,018

[22] Filed: May 29, 1991

[51] Int. Cl.⁵ .................... B62K 17/00; B62K 5/00
[52] U.S. Cl. .................... 280/288.1; 280/281.1; 280/282
[58] Field of Search ............ 280/281.1, 288.1, 282, 280/288.3, 276, 288.4

[56] References Cited

U.S. PATENT DOCUMENTS

| | | | |
|---|---|---|---|
| 1,688,024 | 2/1927 | Scholer | 280/276 |
| 2,482,472 | 2/1946 | Fried | 280/288.1 |
| 3,913,946 | 10/1975 | Valentine et al. | 280/282 |
| 4,108,460 | 8/1978 | Silva | 280/236 |
| 4,283,070 | 8/1981 | Forrestal et al. | 280/274 |
| 4,527,811 | 7/1985 | DeMoss | 280/288.1 |
| 4,618,160 | 10/1986 | McElfresh | 280/281 LP |
| 4,786,070 | 11/1988 | Adee | 280/288.1 |

Primary Examiner—Johnny D. Cherry
Assistant Examiner—Florian Zeender
Attorney, Agent, or Firm—Alvin S. Blum

[57] ABSTRACT

A cycle in the form of a bicycle or a tricycle has an elongate horizontal main frame member with a rear wheel support assembly at the rear end and a front wheel support assembly at the front end. The front wheel support assembly supports the steerable front wheel at the lower end of a slanted steering column and handlebars at the top end slanted toward the rear. A seat and seat back are supported on a rearward-slanting seat standard that is clamped onto the horizontal frame member and may be adjusted fore and aft to provide comfortable access to the pedals mounted on the front end of the horizontal frame member. The seat remains at the same elevation regardless of the adjustment and the pedals are forward and below the hips of the rider. Force on the pedals forces the back against the backrest for enhanced leverage.

9 Claims, 1 Drawing Sheet

ERGONOMIC CYCLES

FIELD OF THE INVENTION

This invention relates to self-propelled, wheeled vehicles and more particularly to bicycles and tricycles that are designed to take full advantage of the operator's physiology for maximum energy efficiency with enhanced safety of operation.

BACKGROUND OF THE INVENTION

In conventional bicycles and tricycles, the seat is between and above the wheels and the pedals are below the rider. The seat may be raised and lowered to accommodate operators of different leg length. Consequently, a tall rider must raise the seat in order to achieve full extension of the leg, for optimum muscle function. Riding high, the operator must bend forward more to operate the handle bars, and bend the neck at an uncomfortable angle to see ahead. With a higher center of gravity, the system has reduced stability. Furthermore, forceful pushing on the pedal lifts the body off the seat. The back is forced into a bent position that is more fatiguing than when in a conventional chair with backrest.

U.S. Pat. No. 4,618,160 issued Oct. 21, 1986 to McElfresh is exemplary of recumbent cycles in which the operator is partially supine with the legs elevated and the handlebars beneath the seat. Both seat and handles adjust together for spacing from the pedals to accommodate different leg lengths. The steering connections, being adjustable, are quite complex. The feet and legs are directly in the line of vision and the head must be bent forward to see ahead. The blood circulation to the leg muscles has evolved for optimum function when the legs are below the hips.

SUMMARY OF THE INVENTION

It is accordingly an object of the invention to provide a self-propelled wheeled vehicle that enables the operator to use the leg muscles most effectively while providing a body position that is least stressful and fatiguing to the body with optimum visibility and maximum stability. It is yet another object that these conditions be readily obtained for operators of different body sizes and types by simple adjustment of the vehicle.

The cycle of the invention may have one or two rear wheels and a single front wheel. A horizontal main frame member connects the rear wheel or wheels to the steering column head assembly that carries the front fork supporting the front wheel and the handlebars. The steering column head assembly is slanted so that the front wheel is forward of the handlebars. This brings the handlebars closer to the operator to eliminate the need for hunching forward.

A seat and backrest are supported on a seat standard that is adjustably mounted on the horizontal main frame member for forward and rearward adjustment. The pedal assembly is mounted at the forward end of the main frame member, and the seat standard is slanted backward so that the seat is to the rear of the standard and the legs extend forward to reach the pedals. Adjusting the seat standard fore or aft on the horizontal main frame member brings the operator closer or farther from the pedals to adjust for operator leg length without changing the elevation of the seat and the center of gravity. The seat and backrest are arranged so that the back is upright, the operator can see ahead with the neck straight and the legs are forward and below the hips. The horizontal main frame member may be comprised of one or more elongate tubular elements. Because a rider with long legs will generally also have long arms, it has been found that the sliding adjustment of the seat standard will bring both hands and feet to correct position without the need for special adjustments of the handlebar positions.

These and other objects, features and advantages of the invention will become more apparent when the detailed description of the invention is studied in conjunction with the accompanying drawings.

DETAILED DESCRIPTION OF PREFERRED EMBODIMENTS

Figure 1:
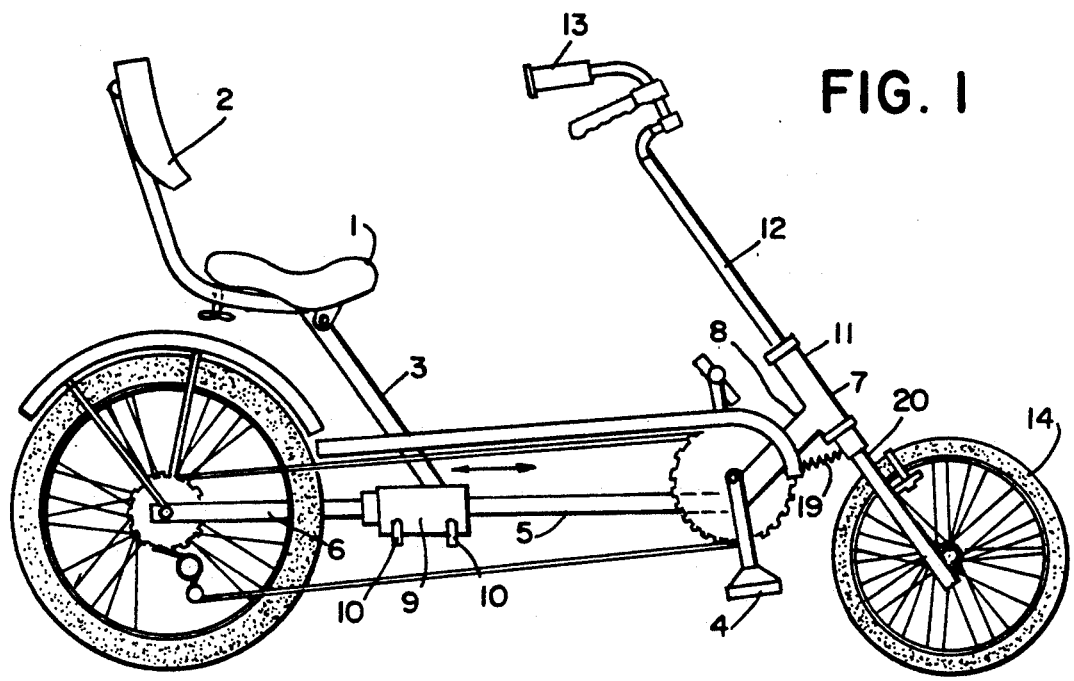
FIG. 1 is a side elevation view of a bicycle of the invention.

Referring now first to FIG. 1, a bicycle of the invention is shown adjusted for a tall rider with seat 1 and backrest 2 supported on seat standard 3 adjusted to their position farthest from the pedals 4 so that the leg can be extended fully during the pedalling operation for most efficient operation of the leg muscles. At all positions of the seat, the hips are always above the feet and at the same height above the road for a uniform center of gravity at all positions of adjustment and keeping the legs out of the field of view. When the legs are pushing forward, the back is forced against the backrest 2 for better leverage without lifting the hips off the seat.

The main frame member 5 is an elongate rectangular tube that extends horizontally between rear wheel support assembly 6 and front wheel support assembly 7. The seat standard 3 is provided at its lower end with a clamp 9 that is a three sided channel that rides on the main frame member 5 and slides fore and aft thereon to adjust the distance between seat and pedals while maintaining a constant elevation of the seat 1 above the roadway. Two quick-acting, hand-operated clamping screw elements 10 secure the seat standard in the adjusted position on the main frame member 5. The front wheel support assembly 7 includes a diagonal beam 8 welded at one end to main frame member 5 and at a second end supporting steering column head 11 that rotatably supports the steering column 12 at a slanted angle so that handlebars 13 at a first end of the column 12 are closer to the rider and the steerable front wheel 14 is farther from the rider. Chain drive, brakes and gearshift controls are conventional and need not be described. An anti-jacknife spring 19 connecting the front fork 20 to the diagonal beam 8 resists rotation of the steering column.

Figure 2:
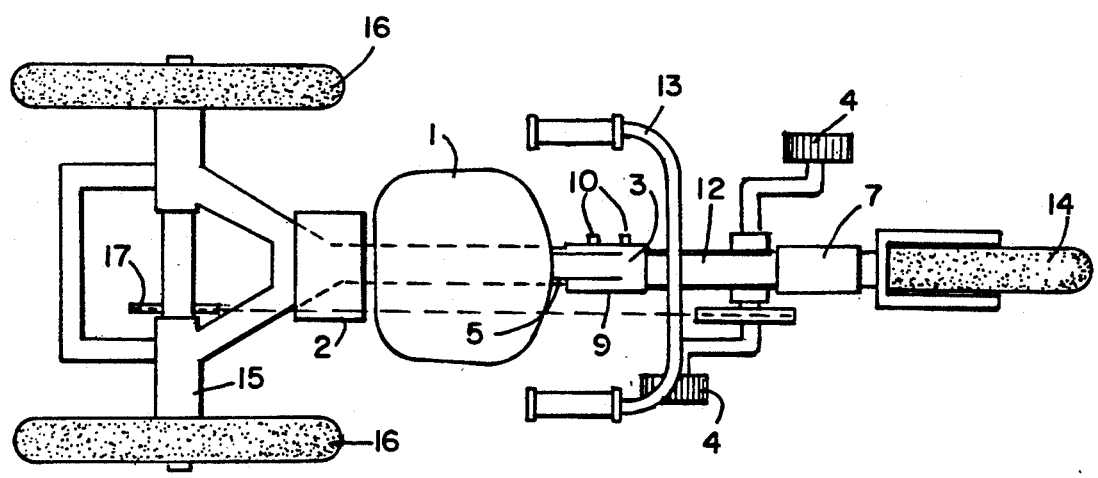
FIG. 2 is a top view of a tricycle of the invention.

Referring now to FIG. 2, a tricycle of the invention is shown that employs the same structures as the bicycle with the difference being the rear wheel support assembly 15 that supports two rear wheels 16 with chain drive sprocket 17 located between the wheels. In the case of both the bicycle and the tricycle the seat is above the level of the wheels.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A vehicle adapted to be operated by a rider, said vehicle comprising:
   a) a seat standard having a seat and a backrest at an upper end, an elongate intermediate portion, and a lower end;
   b) wheel means for permitting said vehicle to roll on the ground, said wheel means including at least one rotatable rear wheel and a rotatable and steerable front wheel;
   c) an elongate rigid, straight, non-bendable steering column means for supporting said front wheel at a first, lower end and having steering handle means at a second, upper end for steeringly turning said front wheel;
   d) front wheel support means for steeringly supporting said steering column means at an angle to the vertical such that said front wheel is forward of said steering handle means;
   e) an elongate main frame member means arranged substantially horizontal to the ground and connected at a forward end to said front wheel support means and at a rear end to a rear wheel support means for supporting at least one rear wheel;
   f) a foot pedal assembly mounted on the forward end of said main frame member means arranged behind said steering column means;
   g) said lower end of said seat standard having infinitely adjustable attaching means for adjustably attaching to said main frame member means, said attaching means being infinitely slidable along said main frame member means to thereby position said rider at that distance from both said steering handle means and said pedal assembly for most effective leg muscle function and arm extension while maintaining said seat at a fixed elevation above the ground; and
   h) said intermediate portion of said seat standard extending upward and rearward to position said seat at an elevation greater than said at least one rear wheel.

2. The vehicle according to claim 1, in which said main frame member means is arranged substantially in a line with the center of rotation of said at least one rear wheel and parallel to the ground.

3. The vehicle according to claim 2, in which said attaching means holds said seat standard captive on said main frame member means.

4. The vehicle according to claim 3, in which said main frame member means includes a rectangular tube having a substantially uniform cross section and said attaching means includes a three-sided channel with at least one clamping screw element for clamping said seat standard on said tube at a location suitable for a user's arm and leg length.

5. The vehicle according to claim 1, further comprising at least one spring connecting said steering column to said front wheel support means to resist oversteering.

6. The vehicle according to claim 1 in the form of a tricycle, said rear wheel support means supporting two rear wheels, in which said two rear wheels rotate about a common axis.

7. The vehicle according to claim 1 in the form of a bicycle, in which said rear wheel support means supports a single wheel.

8. A bicycle to be operated by a rider, said bicycle comprising:
   a) a seat standard having an upper end, an elongate intermediate portion and a lower end;
   b) a seat and a backrest attached to said upper end of said seat standard;
   c) a rotatable rear wheel and a rotatable and steerable front wheel;
   d) an elongate, rigid, straight non-bendable steering column means for supporting said front wheel at a first, lower end and having steering handle means at a second, upper end for steeringly turning said front wheel;
   e) steering column support means for pivotally supporting said steering column means, said steering column support means supporting said steering column at an angle to the vertical such that said front wheel is forward of said steering handle means;
   f) a rigid, elongate main frame member means for connection at a forward end to said steering column support means and at a rear end to a rear wheel support means for supporting said rear wheel, said main frame member means having an elongate intermediate portion of uniform cross section arranged substantially horizontal to a support surface on which the bicycle rests;
   g) a foot pedal assembly mounted on the forward end of said frame member means behind said steering column means;
   h) infinitely adjustable attaching means connected to said lower end of said seat standard for adjustably sliding and attaching to said elongate intermediate portion of said main frame member means to thereby position said rider at that distance from both said steering handle means and said pedal assembly for most effective leg muscle function and arm extension while maintaining said seat at a fixed elevation above the support surface; and
   i) said intermediate portion of said seat standard extending upward and rearward to position said seat at an elevation greater than said rear wheel and away from said main frame member means for ease of mounting and dismounting.

9. A tricycle to be operated by a rider, said tricycle comprising:
   a) seat standard having an upper end, an elongate intermediate portion and a lower end;
   b) a seat and a backrest attached to said upper end of said seat standard;
   c) a pair of rear wheels rotatable about a common axis and a rotatable and steerable front wheel;
   d) an elongate, rigid, straight non-bendable steering column means for supporting said front wheel at a first, lower end and having steering handle means at a second, upper end for steeringly turning said front wheel;
   e) steering column support means for pivotally supporting said steering column means, said steering column support means supporting said steering column at an angle to the vertical such that said front wheel is forward of said steering handle means;
   f) a rigid, elongate main frame member means for connection at a forward end to said steering column support means and at a rear end to a rear wheel support means for supporting said rear wheels, said main frame member means having an elongate intermediate portion of uniform cross section arranged substantially horizontal to a support surface on which the tricycle rests;

g) a foot pedal assembly mounted on the forward end of said frame member means behind said steering column means;

h) infinitely adjustable attaching means connected to said lower end of said seat standard for adjustably sliding and attaching to said elongate intermediate portion of said main frame member means to thereby position said rider at that distance from both said steering handle means and said pedal assembly for most effective leg muscle function and arm extension while maintaining said seat at a fixed elevation above the support surface; and i) said intermediate portion of said seat standard extending upward and rearward to position said seat at an elevation greater than said rear wheels and away from said main frame member means for ease of mounting and dismounting.

* * * * *